(12) United States Patent
Picconatto et al.

(10) Patent No.: US 9,415,326 B1
(45) Date of Patent: Aug. 16, 2016

(54) SYSTEM FOR BULK SEPARATION OF SINGLE-WALLED TUBULAR FULLERENES USING A CHANNELED SUBSTRATE

(71) Applicant: THE MITRE CORPORATION, McLean, VA (US)

(72) Inventors: Carl A. Picconatto, Bethesda, MD (US); James C. Ellenbogen, McLean, VA (US)

(73) Assignee: The Mitre Corporation, McLean, VA (US)

( * ) Notice: Subject to any disclaimer, the term of this patent is extended or adjusted under 35 U.S.C. 154(b) by 563 days.

(21) Appl. No.: 13/900,621

(22) Filed: May 23, 2013

Related U.S. Application Data (62) Division of application No. 12/891,337, filed on Sep. 27, 2010, now Pat. No. 9,079,766.

(51) Int. Cl.
*B82Y 30/00* (2011.01)
*B01D 11/02* (2006.01)
*B82Y 40/00* (2011.01)

(52) U.S. Cl.
CPC .............. *B01D 11/02* (2013.01); *B82Y 30/00* (2013.01); *B82Y 40/00* (2013.01)

(58) Field of Classification Search
None
See application file for complete search history.

(56) References Cited

U.S. PATENT DOCUMENTS

| | | | |
|---|---|---|---|
| 6,187,823 B1 | 2/2001 | Haddon et al. | |
| 6,669,918 B2 | 12/2003 | Schleier-Smith et al. | |
| 7,347,981 B2 | 3/2008 | Crespi et al. | |
| 2009/0085976 A1* | 4/2009 | Silverbrook | B41J 2/14 347/47 |
| 2009/0246408 A1* | 10/2009 | Chan | B82Y 10/00 427/577 |
| 2010/0234477 A1* | 9/2010 | Bao | B01J 21/185 518/716 |

OTHER PUBLICATIONS

Nicholas A. Melosh, et al.; "Ultrahigh-Density Nanowire Lattices and Circuits"; Science Apr. 4, 2003; vol. 300 No. 5616 pp. 112-115.
Michael D. Austin, et al.; "Fabrication of 5 nm linewidth and 14 nm pitch features by nanoimprint lithography"; Appl. Phys. Lett. vol. 84, No. 26; (2004); pp. 5299-5301.
Jung, G. Y., et al.; "Fabrication of a 34×34 Crossbar Structure at 50 nm Half-pitch by UV-based Nanoimprint Lithography"; Nano Letters, vol. 4, issue 7, 2004, pp. 1225-1229.
O'Connell, et al.; "Band Gap Fluorescence from Individual Single-Walled Carbon Nanotubes"; Science; vol. 297; Jul. 26, 2002; pp. 593-596.
Georgakilas, et al. "Organic Functionalization of Carbon Nanotubes"; J. Am. Chem. Soc., 2002, 124 (5), pp. 760-761.

* cited by examiner

*Primary Examiner* — Peter Keyworth
(74) *Attorney, Agent, or Firm* — Rosenberg, Klein & Lee (57) ABSTRACT

A system for bulk separation of single-walled tubular fullerenes (100) based on chirality is provided wherein an array of longitudinally directed channels (32) are formed on a crystalline substrate (30) to form a separation plate (300). At least one of the separation plate (300) and a solution or suspension of the single-walled tubular fullerenes (100) is displaced relative to the other for exposing at least a portion of the plurality of single-walled tubular fullerenes (100) to the channels (32). Each of the channels (32) exposes portions of the upper surface (38) of the crystalline substrate (30) and the longitudinal direction is selected to be an energetically favored "locking angle" for single-walled tubular fullerenes (100a) of one chiral angle to be adsorbed to the exposed is substrate surface (38). The adsorbed single-walled tubular fullerenes (100a) are subsequently removed from the separation plate (300).

12 Claims, 9 Drawing Sheets

SYSTEM FOR BULK SEPARATION OF SINGLE-WALLED TUBULAR FULLERENES USING A CHANNELED SUBSTRATE

RELATED APPLICATIONS

This application is a Divisional patent application of co-pending application Ser. No. 12/891,337, filed on 27 Sep. 2010, now pending. The entire disclosure of the prior application Ser. No. 12/891,337, is considered a part of the disclosure of the accompanying Divisional application and is hereby incorporated by reference.

BACKGROUND OF THE INVENTION

1. Field of the Invention

This invention directs itself to a method and a system for the bulk separation of single-walled tubular fullerenes based on their chiralities. More in particular, the present invention is directed to a method and a system of bulk separation which takes advantage of a phenomenon of preferential adsorption of single-walled tubular fullerenes at an energetically favored angular orientation of an axis of the lattice structure of a crystalline substrate with respect to an axis of a lattice structure of single-walled tubular fullerenes of a particular chiral angle or "chirality". The method utilizes channels formed on the surface of the crystalline substrate that extend longitudinally thereacross at the energetically favored angular orientation. Still further, the present invention is directed to a system wherein at least one of the channeled crystalline substrate and a solution or suspension of the single-walled tubular fullerenes is displaced relative to the other for exposing at least a portion of the plurality of single-walled tubular fullerenes to the surface of the substrate exposed within the longitudinally extended channels.

2. Prior Art

The unique electrical and mechanical properties of tubular fullerenes and particularly carbon nanotubes for such applications as constructing nanoscale electronic circuitry and nanoscale mechanical devices has created a ever increasing demand for these structures. The electrical properties of carbon nanotubes can vary between metallic, highly conductive structures and those which are semiconducting as a function of their chirality, the angle at which the graphitic lattice spirals about the tubular contour of the nanotubes. The mechanical properties of carbon nanotubes also vary as a function of chirality. As a result of these characteristics, there is a demand for synthesizing the tubular fullerenes in a particular desired chirality required for an individual application. However, thus far the synthesis of carbon nanotubes produces a mixture of chiralities. Hence, there is a commercial need for a process to separate nanotubes of a desired chirality from all those produced.

In the earliest approach, a very tedious and inefficient mechanical separation process utilizing a nanoprobe (e.g., an atomic force microscope) was used to segregate nanotubes of a desired chirality from the mixture of chiralities produced. That method was a painstakingly slow process barely suitable to provide nanotubes for laboratory use.

An improvement over the mechanical separation technique is described in U.S. Pat. No. 6,669,918, which utilizes a template to which carbon nanotubes of a desired chirality are adsorbed thereto and subsequently removed therefrom. Using the property that carbon nanotubes of different chiralities adhere preferentially to a crystalline substrate with a lattice structure at different energetically favored angles with respect to a lattice axis of the substrate, a template is prepared using carbon nanotubes of the desired chirality which are deposited on a crystalline substrate and surrounded by a molecular layer of a material having a greater affinity for the substrate than the carbon nanotubes. The deposited nanotubes are removed to thereby provide openings in the molecular covering layer that are disposed at the angle that energetically favors adsorption of carbon nanotubes of the desired chirality therein. The template is then submerged in a solution or suspension of carbon nanotubes of mixed chiralities for sufficient time for random molecular motion to bring nanotubes of the desired chirality into proximity with the template openings. The adsorbed nanotubes are subsequently removed and the template re-submerged to separate further nanotubes of the desired chirality. This process had to rely on the mechanical separation technique to provide the nanotubes used to construct the template and repeated steps of a rather slow process for exposing the template opening to the nanotubes of the desired chirality.

A more direct method for interaction between the chiral surfaces of nanotubes of a desired chirality with the crystalline substrate followed, as described in U.S. Pat. No. 7,347,981. In this method, a fluid containing a plurality of nanotubes having a mixture of different chiralities is flowed across the surface of a crystalline substrate at the chiral angle that energetically favors adsorption of nanotubes having the desired chirality. The adsorbed nanotubes can then be removed from the substrate and the process repeated. A faster and far more efficient separation process over the template method, this directed flow method was not without complications. In order to separate the nanotubes of the desired chirality, the nanotubes in the flow had to have their longitudinal axes aligned with the flow so that they would be oriented at the energetically favored angle of the chirality selected for separation. While a number of techniques for aligning the axes of the nanotubes with the flow exist, it is still a requirement that adds complexity to the equipment and procedures that must be used to carry out this separation process.

Whereas the invention of the subject Patent Application utilizes the interaction between the chiral surfaces of nanotubes of a desired chirality with a crystalline substrate, the need to form a template and depend on random molecular motion, or axially align the nanotubes with a flow and to direct the flow at a critical angle is avoided. In the present invention the tubular fullerenes are brought into contact with a channeled crystalline substrate by relative displacement of one with respect to the other, without regard to the angular orientation of either. This simpler separation implementation is achieved by forming channels on the substrate surface that are oriented at the energetically favored angle for adsorption of the nanotubes of the desired chirality. Those randomly oriented nanotubes that are aligned with the channels will enter the channels and contact the substrate surface, with those of the desired chirality being adsorbed thereto. The nanotubes entering the channels that are of a chirality other than the desired chirality and any of the nanotubes not passing into a channel will not be held to the substrate surface. Despite the element of randomness associated with this method, the vast number of nanotubes present in any macroscopic volume of fluid, in either solution or suspension, provides sufficient efficiency of bulk chiral separation of nanotubes for a viable commercial process.

SUMMARY OF THE INVENTION

A method is provided for bulk separation of single-walled tubular fullerenes based on chiral angle. The method includes the steps of providing a plurality of single-walled tubular fullerenes of a multiplicity of differing chiral angles in a fluid, and providing a crystalline substrate having a lattice structure. The method also includes the step of forming an array of longitudinally directed channels disposed on an upper surface of the crystalline substrate to define a separation plate. Each of the channels exposes portions of the upper surface of the crystalline substrate. The longitudinal direction is selected to be at an energetically favored angular orientation of an axis of the lattice structure of the crystalline substrate with respect to an axis of a lattice structure for single-walled tubular fullerenes of one chiral angle to be adsorbed to the crystalline substrate. The method further includes the step of displacing at least one of the fluid containing the plurality of single-walled tubular fullerenes or the separation plate relative to the other for exposing at least a portion of the plurality of single-walled tubular fullerenes to the channels. Further, the method includes preferentially adsorbing single-walled tubular fullerenes of the one chiral angle passing into a respective one of the channels to the upper surface of the crystalline substrate exposed therein. Still further, the method for bulk separation of single-walled tubular fullerenes includes the step of removing the single-walled tubular fullerenes adsorptively held to the crystalline substrate.

From another aspect, a system is provided for bulk separation of single-walled tubular fullerenes based on chiral angle. The system includes a container assembly for holding and dispensing a fluid bearing single-walled tubular fullerenes of a multiplicity of different chiral angles. The system further includes a separation plate defined by a crystalline substrate having a lattice structure exposed within a plurality of longitudinally directed channels formed thereon. The longitudinal direction is selected to be at an energetically favored angular orientation of an axis of the lattice structure of the crystalline substrate with respect to an axis of a lattice structure for single-walled tubular fullerenes of one chiral angle to be adsorbed to the crystalline substrate. The system additionally includes a transport assembly coupled in fluid communication with the container assembly and has at least one outlet for discharging the fluid bearing the single-walled tubular fullerenes to flow across the separation plate. Any of the single-walled tubular fullerenes of the one chiral angle passing into a respective one of the channels is preferentially adsorbed and thereby held to the exposed portions of the upper surface of the crystalline substrate therein. Further, the system for bulk separation of single-walled tubular fullerenes includes a collection assembly disposed adjacent to and downstream of the separation plate for receiving the fluid and any of the single-walled tubular fullerenes not adsorbed on the crystalline substrate.

From yet another aspect, a system for bulk separation of single-walled tubular fullerenes based on chiral angle is provided. The system includes a receptacle for holding a fluid bearing single-walled tubular fullerenes of a multiplicity of different chiral angles. The system also includes a separation plate defined by a crystalline substrate having a lattice structure exposed within a plurality of longitudinally directed channels formed thereon. The longitudinal direction is selected to be at an energetically favored angular orientation of an axis of the lattice structure of the crystalline substrate with respect to an axis of a lattice structure for single-walled tubular fullerenes of one chiral angle to be adsorbed to the crystalline substrate. The separation plate is insertable into the receptacle for immersion in the fluid. The system for bulk separation of single-walled tubular fullerenes further includes a displacement assembly for displacing the fluid relative to the separation plate. Any of the single-walled tubular fullerenes of the one chiral angle that pass into a respective one of the channels by the relative displacement are preferentially adsorbed and thereby held to the exposed portions of the upper surface of the crystalline substrate therein.

DETAILED DESCRIPTION OF THE PREFERRED EMBODIMENTS

There has been an ever increasing need to provide single-walled tubular fullerenes, particularly carbon nanotubes, for use in constructing molecular-scale electronic circuits and mechanical devices. The characteristics, both mechanical and electrical, of single-walled tubular fullerenes are related to the chirality of the tubular structures. However, to date, tubular fullerene synthesis produces a mixture of chiralities. Accordingly there is a great need to efficiently and economically separate tubular fullerenes of a desired chirality from the mixture of chiralities that are synthesized.

Chirality is the degree of "twist" or "spiral" in the lattice structure of a nanotube, and is described by an angle (chiral angle), as will be further described hereinafter. For purposes of the description herein, the two terminologies, "chirality" and "chiral angle," are equivalent in their meanings as applied to the structure of tubular fullerenes.

Figure 1A:
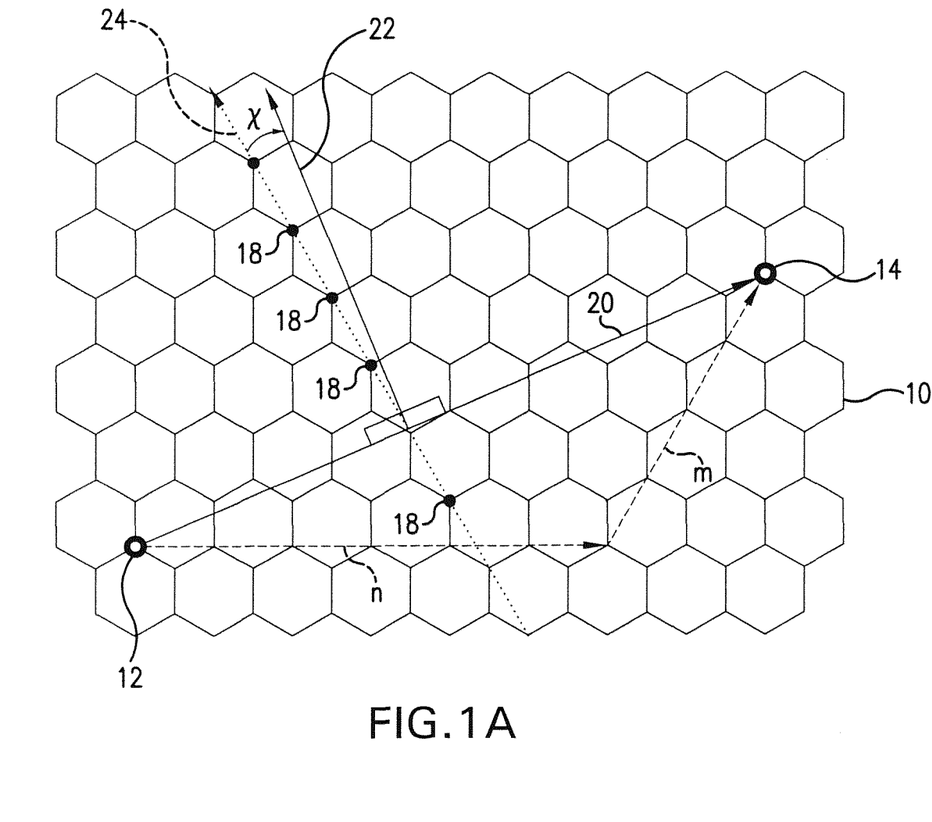
FIG. 1A is a diagram illustrating the derivation of the chiral angle.

To better illustrate the concept of chirality, reference is now made to FIG. 1A. In FIG. 1A, the planar lattice 10 is shown wherein an arbitrary atom 12 defines the origin for the chiral vector 20 that extends from atom 12 to another atom 14 on the lattice which would coincide with the atom 12 if the planar lattice were rolled to form a nanotube. The chiral vector 20 is the summation of n times a first unit vector $a_1$ and m times a second unit vector $a_2$, where the unit vectors are defined from the hexagonal geometry of the lattice, as is well known in the art. Thus, n and m are integers in the vector equation:

$$R = na_1 + ma_2. \quad (1)$$

Therefore, the axis 22 of the nanotube is defined as a line projecting orthogonally from the chiral vector 20. In the specific instance of FIG. 1A, the vector description for the nanotube defined by vector 20 is a (6, 4) nanotube. Where n does not equal m, the axis of the lattice 24, a line projected through corresponding atoms 18 of the lattice, does not coincide with the axis of the nanotube 22, such deviating by the chiral angle $\chi$.

Figure 1B:
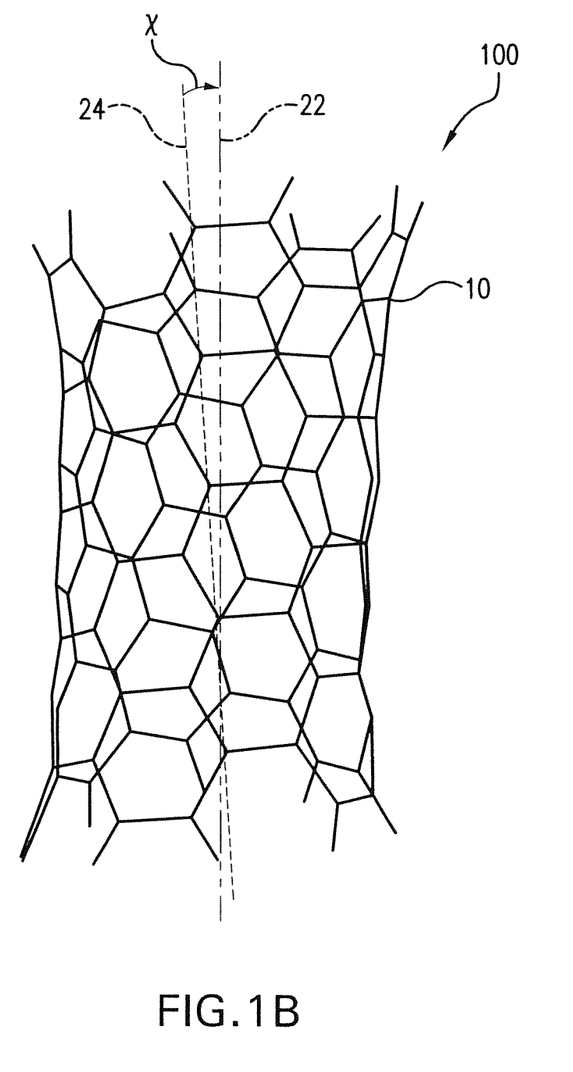
FIG. 1B is a perspective view of a tubular fullerene illustrating the chirality thereof.

In FIG. 1B, the tubular fullerene 100 represents the resulting structure obtained when the lattice 10 is rolled, as previously described. The single-walled carbon nanotube has a longitudinal axis 22 with a lattice axis 24 which deviates from the longitudinal axis of the nanotube by the chiral angle, as previously described.

Figure 2:
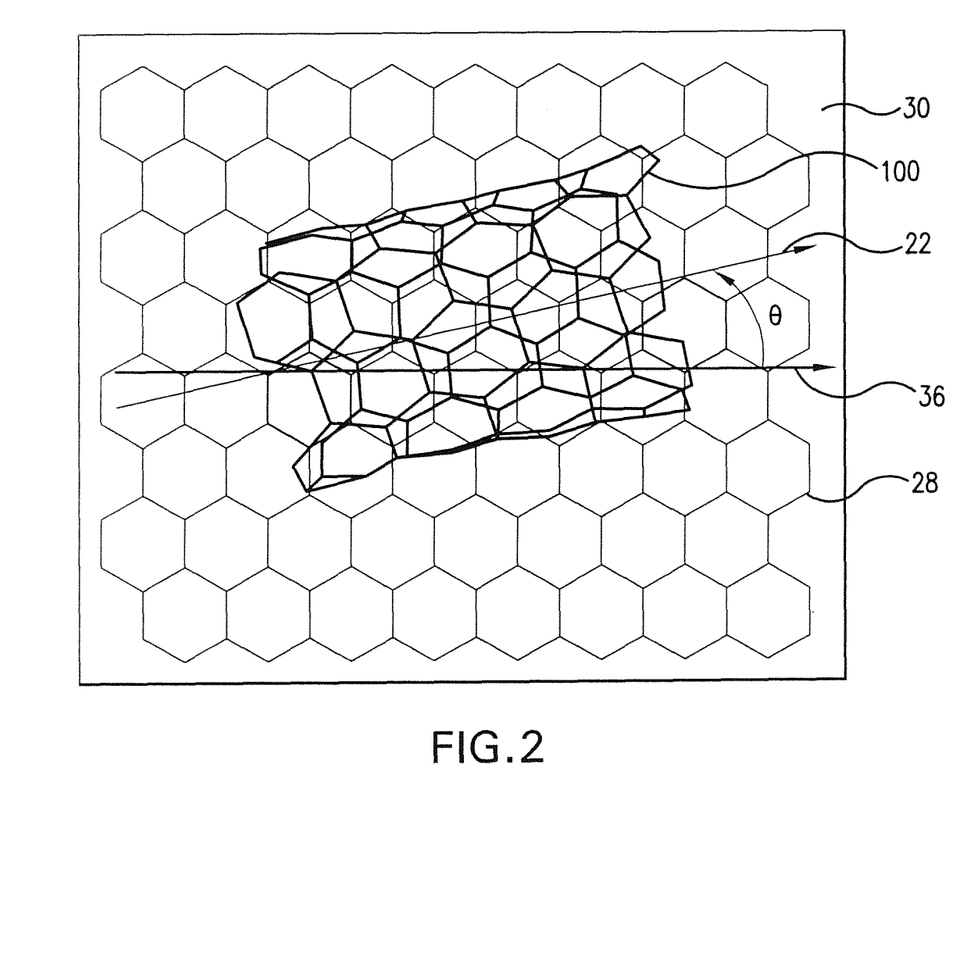
FIG. 2 is a schematic illustration of a tubular fullerene self-orienting on a substrate lattice.

To illustrate the principles upon which selective adsorption of single-walled tubular fullerenes is based, reference is now made to FIG. 2. In FIG. 2, a tubular fullerene 100 is disposed on a crystalline or highly oriented substrate 30. In this case, a carbon nanotube is illustrated as being disposed on a graphite substrate, the structures of each being formed by hexagonal lattices. Where the two structures have the same lattice structure, the tubular fullerene has an energetically favored orientation wherein the hexagonal lattices of the tubular fullerene and the substrate are mutually aligned. That is, they are said to be disposed in registry with one another. Therefore, as the tubular fullerene 100 is formed by a lattice with a chiral twist, the axis 22 of the tubular fullerene 100 is angularly displaced with respect to a longitudinal axis 36 of the substrate lattice 28. The angular orientation of the tubular fullerene axis 22 relative to the substrate lattice axis 36 is an angle $\theta$ which is equal to the chiral angle x. The angle $\theta$ is also referred to as the "locking angle", as it is the angle where the nanotube establishes an energetically favored equilibrium orientation due to a very sharp energy minimum that leads to molecular-scale locking of the nanotube. That energy profile repeats every 60°, reflecting the lattice symmetry of the crystalline or highly oriented substrate. In addition to these energetically favored "lowest order" locking angles at which the lattices of the tube and substrate coincide with the shortest possible periodicity, a small set of additional energetically favored "higher order" locking angles can occur in which the lattice of the tube and the substrate possess a higher-order alignment which repeats with a longer period. Therefore, when tubular fullerenes are deposited on a substrate lattice with substantially the same lattice structure, as when carbon nanotubes are deposited on a graphite substrate, nanotubes of different chiralities will be self-organized at different and stable angular orientations by a relatively high binding energy, as described in U.S. Pat. No. 7,347,981.

Raw fullerene nanotubes usually are produced in the form of long, tangled ropes of many nanotubes, which are held in close contact by strong van der Waals interactions. As is well known in the art, the nanotube ropes can be separated and cut to form individual shorter open-end tubular fullerenes by sonication in a 3:1 mixture of concentrated sulfuric and nitric acids (98% and 70%, respectively) at 40° Centigrade. The thus produced "fullerene pipes" are more manipulable and better suited for use in molecular electronics, and for being functionalized to improve the solubility thereof, as disclosed in U.S. Pat. No. 7,347,981 and summarized as follows.

The solubility of the tubular fullerenes may be enhanced by end functionalizing the tubular fullerenes with long-chain amines. Such end-functionalized tubular fullerenes provide enhanced solubility without impairing deposition of the tubular fullerene on the substrate 30. Similar end functionalization is also described in U.S. Pat. No. 6,187,823. Side functionalization of the tubular fullerenes, as is known in the art, without disturbing the self-orienting deposition character of the fullerenes also may be used to provide the desired enhanced solubility of the fullerenes.

Figure 5:
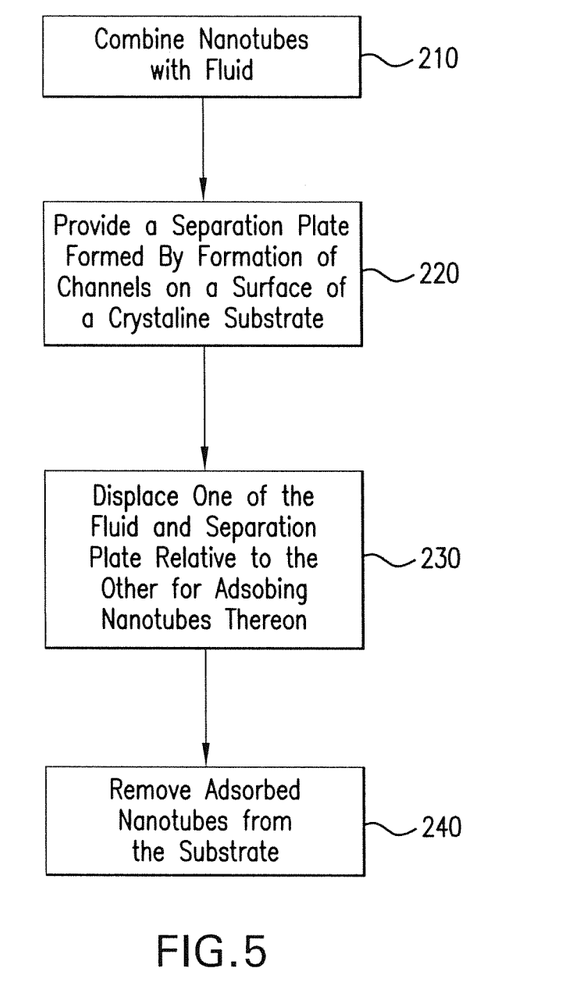
FIG. 5. is a block diagram illustrating the method of the present invention.

Turning now to FIG. 5, there is shown a block diagram illustrating the method for bulk separation of single-walled tubular fullerenes using a channeled substrate. The tubular fullerenes are referred to as "nanotubes" and may be carbon nanotubes in particular. In block 210, a plurality of nanotubes of a multiplicity of differing chiral angles are combined with a fluid. That combination may be achieved by forming a suspension of nanotubes or dissolving the nanotubes in a solvent. As some dissolution can occur to nanotubes suspended in a liquid and not all nanotubes may be dissolved in a solvent, the combination of nanotubes with liquid may be represented by both dissolved and suspended nanotubes. The single-walled tubular fullerenes may be placed in an aqueous suspension by the addition of a surfactant. Surfactants such as sodium dodecyl sulfate and octylphenol ethylene oxide condensate, sold under the trade name Triton X-100 by Union Carbide, are known in the art for use in forming suspensions of carbon nanotubes. The tubular fullerenes that are dissolved to form a solution may be functionalized to enhance their solubility. The tubular fullerenes may be end functionalized, as previously discussed, or side functionalized, as described in V. Georgakilas et al., "Organic Functionalization of Carbon Nanotubes," *J. Am. Chem. Soc., Vol.* 124, No. 5, 2002. Alternately, tubular fullerenes may be enveloped in micelles, as described in M. O'Connell et al., "Band Gap Fluorescence from Individual Single-Walled Carbon Nanotubes," *Science, Vol.* 297, 26 Jul. 2002, pgs. 593-596. Thus prepared, nanotubes may be dissolved or suspended in water or an organic solvent, such as ether, dichloromethane, trichloromethane, acetone, methanol, or ethanol, as examples. The nanotubes also may be disposed in a gaseous composition and propelled across the substrate in the flow of the gas.

Figure 3:
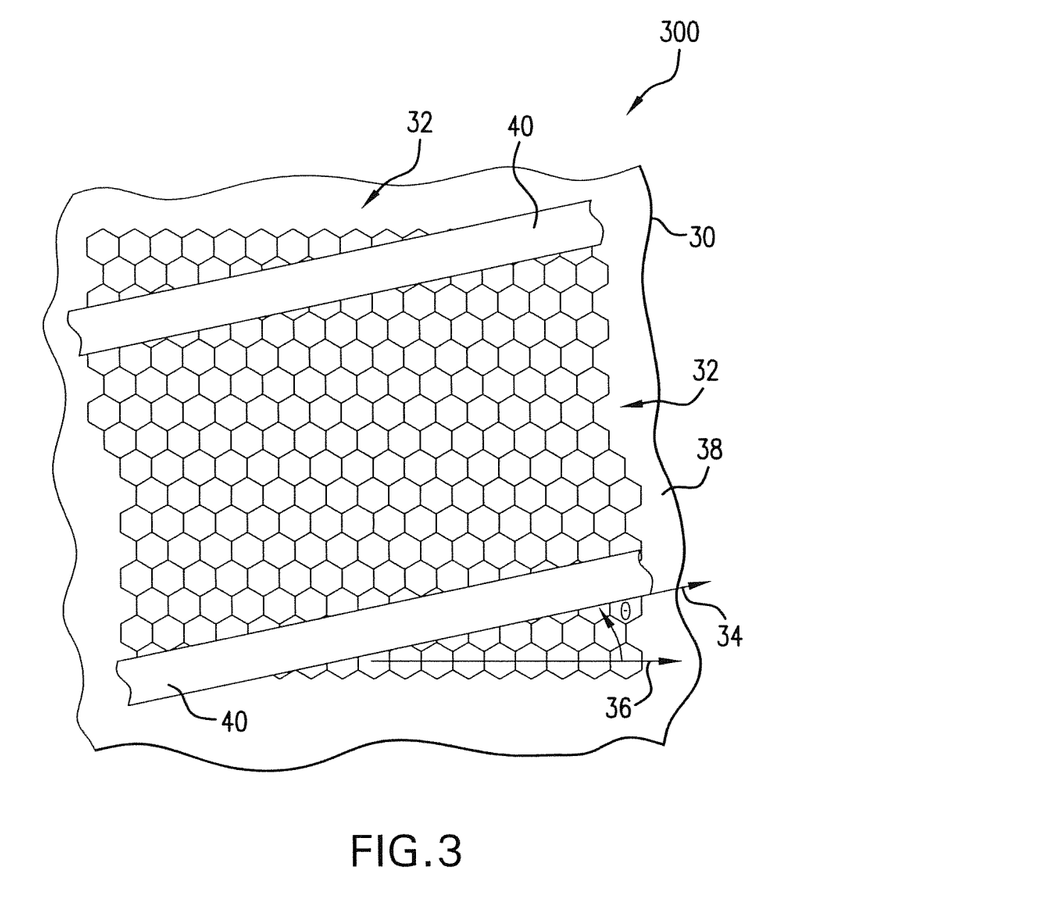
FIG. 3 is a schematic illustration of the structure of a separation plate of the present invention.

From the step of combining the nanotubes with a fluid, the method proceeds to step 220 wherein a separation plate is provided that has been formed by formation of channels on the surface of a crystalline or highly oriented substrate that will subsequently be used to separate nanotubes of a selected chirality. Referring to FIG. 3, the substrate 30 of separation plate 300 has a lattice 28 that may be brought into registry with the lattices of the nanotubes, plus a plurality of substantially parallel barrier members 40 formed on the surface of that substrate and extending from edge-to-edge thereof. The plurality of barrier members define an array of longitudinally directed channels 32 extending continuously across the surface 38 of the substrate 30. Each channel 32 is formed between a respective adjacent pair of barrier members 40 and exposing portions of the substrate lattice 28 of the substrate surface 38 therein. The barrier members 40 are oriented such that the axis of the exposed lattice portions within the channels 32 are disposed at a predetermined angle $\theta$ relative to the longitudinal axis 36 of the substrate 30. The angle $\theta$ is the locking angle for the nanotubes of the selected chirality.

Figure 4:
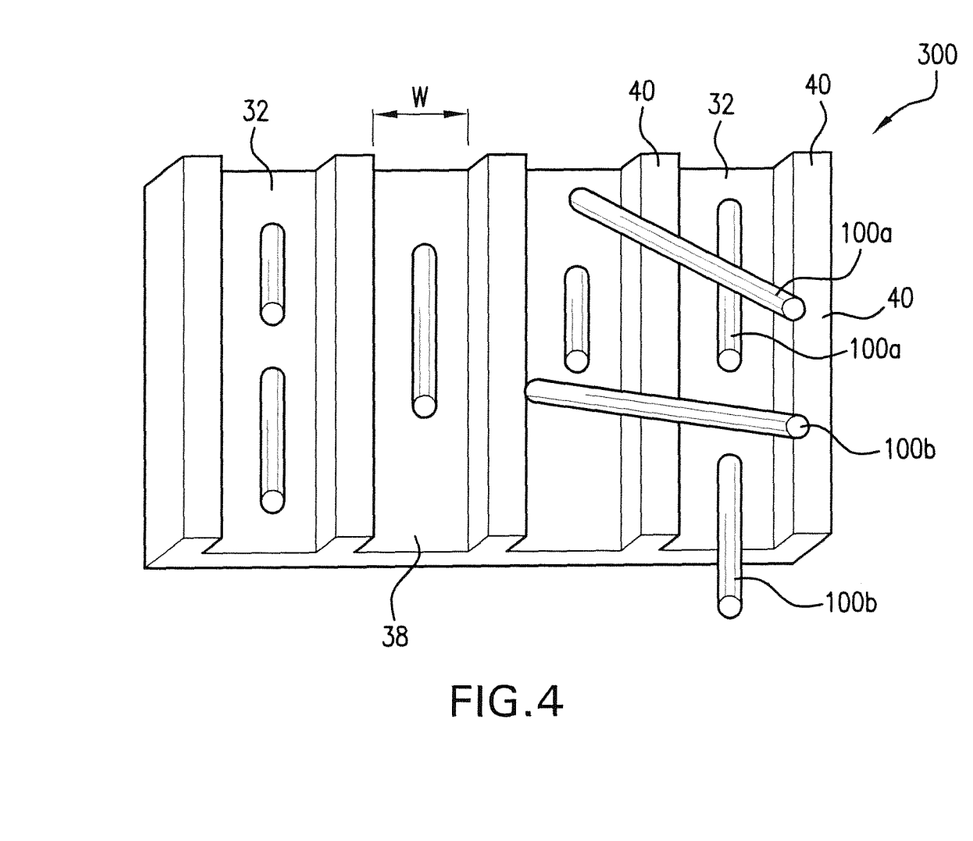
FIG. 4 is a schematic illustration of the use of the separation plate of the present invention.

For adsorbing carbon nanotubes, a material having a hexagonal lattice structure is used, like that of a highly oriented pyrolytic graphite substrate. It should be understood that other materials having a hexagonal lattice structure, such as, but not limited to, boron nitride, hexagonal silicon, and hexagonal silicon carbide, may also be used. While the form of the commensurations would be more complex than that for graphite, the locking angles would still be determinable. The predetermined angle of the lattice axis is selected based on the particular chirality of the nanotubes to be separated from the nanotube-containing fluid. Nanotubes that are randomly aligned with the channels 32 will pass over the oriented substrate lattice. Those nanotubes having the particular chirality whose locking angle coincides with the orientation of the channels 32 will be preferentially adsorbed, while others will flow with the fluid and pass out of the channels 32, as illustrated in FIG. 4.

The barrier members 40 may be formed by any of a number of state-of-the-art nano-fabrication processes, including, but not limited to, electron-beam-lithography (EBL), atomic force microscopy (AFM), ion beam lithography (IBL), photocurable nanoimprint lithography (P-NIL) and superlattice nanowire pattern transfer (SNAP). The "pitch" of the barrier members 40 must be such that the spacing between adjacent barrier members 40 is, at a minimum, slightly greater than the diameter of a nanotube, which is approximately one nanometer. However, as there can be an angular tolerance in the orientation of the nanotube with respect to the locking angle, a spacing greater than being slightly larger than the diameter of a nanotube is desirable. Since the locking angles for different chiralities are offset by sixty degrees and higher order and transverse commensurations are offset by at least thirty degrees, as shown in U.S. Pat. No. 7,347,981, there is sufficient leeway for a relatively wide channel width W to provide separation based on chirality. For nanotubes having an average length of 100 nanometers, and allowing for a minimum angular tolerance of three degrees, the channel width W computes to be ten nanometers. Thus, a channel width in the range of 10-20 nanometers would allow for an angular tolerance of 3-6 degrees and would be significantly outside the range of the higher order and transverse commensurations. The pattern of barrier members 40 that form the array of channels 32 may be formed of semiconductive material (e.g. polysilicon, germanium, and group III-V materials, such as gallium, arsenic, indium phosphide, indium arsenide, etc.); metals, such as gold, platinum, chromium, aluminum; organic polymeric materials, such as polydimethylsiloxane; and materials having a greater affinity for the crystalline substrate than single-walled tubular fullerenes, such as adenine, uracil, thymine and guanine, and similar compositions such as xanthine. The barrier members need only have a height sufficient to form channels having a depth of a few nanometers.

Figure 6:
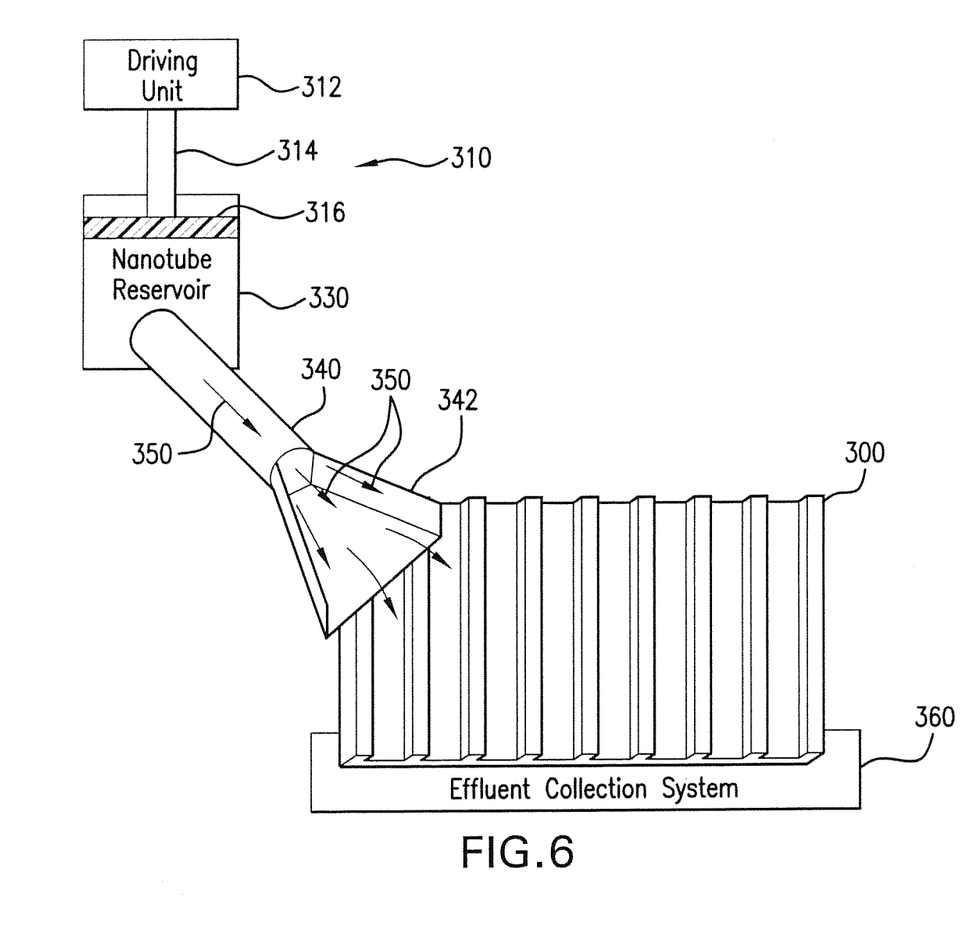
FIG. 6. is a schematic illustration of one system for practicing the present invention.
Figure 7:
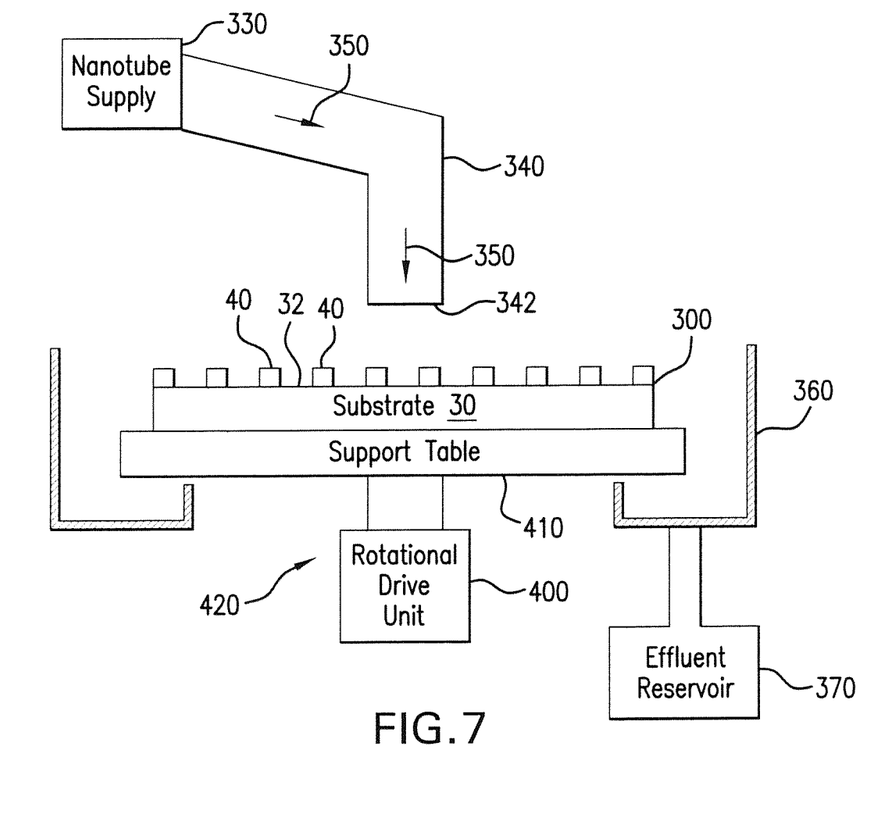
FIG. 7. is a schematic illustration of another system for practicing the present invention.
Figure 8:
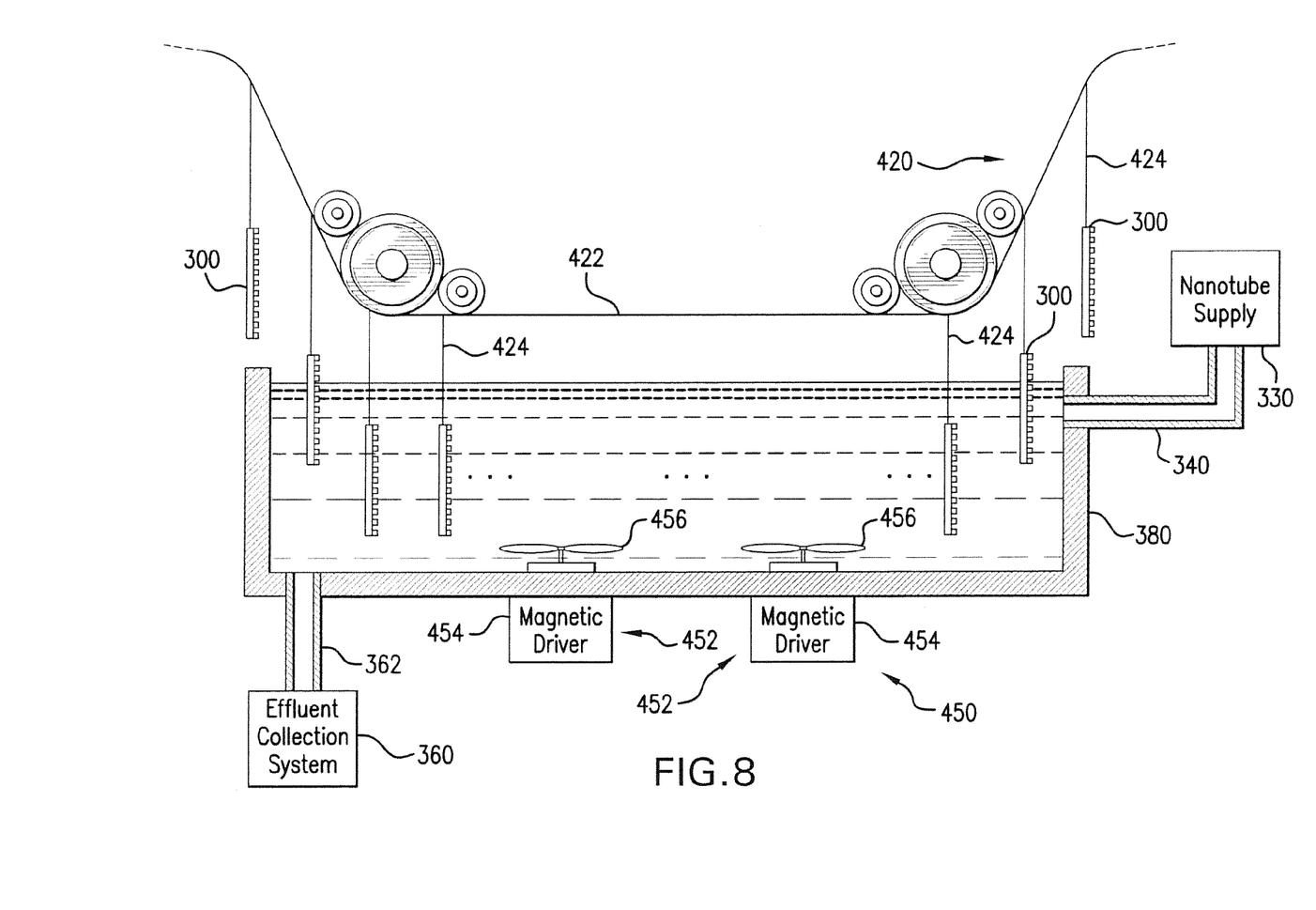
FIG. 8. is a schematic illustration of still another system for practicing the present invention.

In step 230, a relative displacement between the fluid containing the nanotubes 100 and the separation plate 300 is carried out so that any of the plurality of nanotubes 100a of the selected chirality that enter a channel 32 will be adsorbed to the exposed substrate surface 38 therein. The nanotubes 100a of the selected chirality that do not enter a channel 32 and all of the nanotubes 100b of other chiralities, whether they enter a channel 32 or not, will pass over the separation plate 300 and flow to an effluent collection system 360, as illustrated in FIGS. 6-8. As will be discussed in following paragraphs, the design of separation plate 300 permits the fluid containing the nanotubes 100 to be displaced relative to the separation plate 300 in a flow in any direction with respect to the channels 32, and without a necessity to force an alignment of the nanotubes 100 with that flow. The nanotubes 100 are randomly oriented with the respect to the flow direction of the fluid in which they are transported, and the fluid may be flowed onto the separation plate 300 in a direction corresponding to the longitudinal direction of the channels 32 or angularly offset therefrom, including orthogonal to the plane of the of the substrate surface 38.

As will further be discussed, the relative displacement between separation plate 300 and the fluid containing the nanotubes 100 can likewise be accomplished by passing the separation plate 300 through a collection of nanotubes in solution or suspension. During the displacement of the separation plate 300, those nanotubes 100a of the selected chirality that happen to be aligned with a corresponding channel 32, will pass into the channel as they are brought together by the movement of the separation plate 300 and adsorbed to the exposed substrate surface 38. Here again, those nanotubes 100a of the selected chirality that do not happen to be aligned with a channel 32 and all of the nanotubes 100b of other chiralities, whether they are aligned with a corresponding channel 32 or not, will not be adsorbed to the separation plate 300.

In step 250, the nanotubes 100a that have been adsorbed are removed from the substrate surface 38 of the separation plate 300. The nanotubes 100a that have been adsorbed to the substrate surface 38 can be removed by a number of different methods. For instance, when the nanotubes 100a have been adsorbed from a suspension thereof, the nanotubes 100a may then be subsequently removed utilizing a solvent, in a process that may include functionalization of the adsorbed nanotubes 100a to increase their solubility. In addition to end and side functionalization, the technique for increasing solubility by polymer wrapping also may be utilized. When the nanotubes 100 combined with the fluid are dissolved in a solvent and flowed across the substrate, the nanotubes 100a which have been adsorbed out of that solution can be removed from the substrate surface 38 by dissolving the adsorbed nanotubes 100a in a solvent in which they are relatively more soluble than the fluid originally used to deposit them and effect the separation. Likewise, the solubility of the adsorbed nanotubes 100a can be enhanced by side functionalization, end functionalization, or polymer wrapping. The dissolution removal process may include or be performed in combination with the addition of energy from heating, electric fields, mechanical vibration, etc., to enhance this process. The adsorbed nanotubes 100a also may be mechanically "wiped off" of the substrate, "washed off" utilizing a flow of a liquid or a gas directed through the channels 32 parallel to the planar substrate surface 38, or removed through the use of centrifugation, to force off the adsorbed nanotubes 100a as the substrate is subjected to angular acceleration. As an alternative, both the substrate surface 38 and nanotubes 100a can be coated with single chain alkanes to accentuate the selectivity of the process. The nanotubes 100a can then be removed from the substrate with dissolution of the coating.

Turning now to FIG. 6, a schematic illustration of one configuration for practicing the bulk separation process of FIG. 5 is shown. The system includes a fluid reservoir 330 wherein nanotubes 100 of a multiplicity of chiralities are combined in a solvent or suspension fluid that are used to transport the nanotubes 100 through a conduit 340 to the separation plate 300. The transport of the combination of nanotube 100 and the fluid may be made through the use of gravity by location of the reservoir 330 at an elevation above that of separation plate 300. As an alternative to gravity flow or as an enhancement thereto, flow augmentation system 310 may optionally be provided to increase the flow rate of the nanotube-bearing fluid. Augmentation system 310 includes a driving unit 312 that provides the force for displacing the nanotube-bearing fluid from reservoir 330. Driving unit 312 may be a pump or gas source that pressurizes the reservoir through an actuator 314 that serves as a conduit for the pressurized gas. As illustrated in FIG. 6, driving unit 312 provides the motive power for displacing an actuator 314 to pump or otherwise displace the nanotube-containing fluid to provide the desired flow rate of the nanotube-bearing fluid across the substrate. One means of displacing the nanotube-bearing fluid from reservoir 330 is through a displaceable wall or piston 316 coupled to the actuator 314 and driven by driving unit 312. Driving unit 312 and actuator 314 together may represent such displacement arrangements as embodied in a jackscrew, other mechanical, hydraulic, or pneumatic displacement systems. Reservoir 330 may have multiple displaceable or collapsible walls upon which driving unit 312 and actuator 314 acts.

The reservoir 330 has at least one outlet through which the nanotube-containing fluid flows. The flow from the outlet of reservoir 330 is coupled to a conduit 340 that carries the nanotube-bearing fluid to the separation plate 300. The nanotube-bearing fluid flows through the conduit 340, as indicated by the directional arrows 350 to wash over the separation plate. Thus, the conduit outlet 342 is designed to distribute the nanotube-bearing fluid across the separation plate rather than to direct the flow in a stream. The nanotube-bearing fluid, containing unadsorbed nanotubes 100 flows into an effluent collection system 360. This effluent collected in system 360 contains nanotubes of the selected chirality and therefore it is desirable to recycle the effluent to repeat the process to extract further nanotubes of the selected chirality, or to combine with a virgin mix of nanotubes 100 and fluid. The collected effluent also may be recycled to separate nanotubes of other chiralities. Once the flow of nanotube-bearing fluid from reservoir 330 has stopped, the separation plate 300 can be processed to remove the adsorbed nanotubes 100a of the desired chirality therefrom.

Referring additionally to FIG. 7, a schematic illustration of a further configuration for practicing the bulk separation process of FIG. 5 is shown. Various elements of the configuration shown in FIG. 7 can be substituted for those in the configuration of FIG. 6, and those shown in FIG. 6 can be substituted for those in FIG. 7. Thus, the configurations shown in FIGS. 6 and 7 are not to be considered as separate embodiments, but are illustrative of possible variations in accomplishing the inventive method for bulk separation of tubular fullerenes based on chirality.

The single-walled tubular fullerenes (nanotubes) 100 of a multiplicity of differing chiralities combined with a fluid are supplied from the reservoir 330 through a conduit 340. The flow of the nanotube-bearing fluid, as indicated by the directional arrows 350, is provided by gravity in this example. Clearly, the gravity flow illustrated in the illustrated configuration may be supplemented by the flow augmentation system 310 previously described. The nanotube-bearing fluid flows from the conduit outlet 342 onto the separation plate 300 in a direction that is orthogonal or substantially angularly offset with respect to the plane of the surface of the substrate 30. The outlet 342 may be disposed in correspondence with one edge of separation plate 300, where the separation plate 300 is inclined to permit the effluent to runoff to the effluent collection system 360.

The conduit outlet 342 may be positioned to coincide with a central portion of the separation plate 300, and the separation plate 300 is mounted to a separation plate displacement system 420. The separation plate 300 is releasably secured to a support table 410 that is rotatably driven by a rotational drive unit 400. The rotating support table 410 may be inclined to utilize gravity to displace the effluent to the effluent collection system 360. The support table 410 need not be inclined where the rotational speed is sufficient for centrifugal force to displace the effluent to an annularly shaped effluent collection system 360. The effluent received by the effluent collection system 360 is collected in an effluent reservoir 370. The nanotube-bearing fluid in the effluent reservoir 370 may be recycled to repeat the process to extract further nanotubes of the selected chirality, or to combine with a virgin mix of nanotubes 100 and fluid. The collected effluent also may be recycled to separate more nanotubes of the same or other chiralities therefrom.

Referring now to FIG. 8, there is shown a schematic illustration of a still further configuration for practicing the bulk separation process of FIG. 5. The nanotubes 100 of a multiplicity of differing chiralities combined with a fluid are supplied from the reservoir 330 through a conduit 340 to a separation tank 380 at a flow rate determined by the rate at which separation plates 300 pass through the separation tank and the flow rate of effluent from the separation tank 380. Effluent from the separation tank 380 flows through an effluent conduit 362 to an effluent collection system 360. This nanotube-bearing fluid collected in system 360 contains nanotubes of the selected chirality that had not been adsorbed and therefore may be recycled for further exposure to separation plates 300 in separation tank 380. The recycled effluent is combined with a virgin mix of nanotubes 100 and fluid supplied from the reservoir 330. The collected effluent also may be transferred to another separation tank for separation of nanotubes of other chiralities.

One or more separation plates 330 are displaced relative to the nanotube-bearing fluid contained in separation tank 380 by the separation plate displacement system 420. For this configuration, the separation plate displacement system 420 includes a separation support 424 for supporting and transporting a respective separation plate 300 to, through, and from the separation tank 380. Each support 424 is coupled to a displacement drive system 422 that is designed to immerse separation plates 300 into the separation tank 380, displace the separation plates 300 in the separation tank 380 and then withdraw the separation plates 300 from the separation tank 380. As schematically depicted, the displacement drive system 422 may be in the form of an overhead conveyor system from which a plurality of separation plates 300 are suspended by corresponding separation supports 424. The displacement drive system 422 may transport the separation plates 300 to a station for removal of the adsorbed nanotubes and then return the separation plates 300 to the separation tank 380 in a continuing process.

The displacement of separation plates 300 through separation tank 380 will serve to stir and mix the fluid within the tank. Where further mixing of the fluid in the separation tank 380 is desired, the fluid agitation system 450 may optionally be employed to introduce sufficient turbulence of the fluid within the tank to provide the desired degree of mixing. Agitation system 450 is shown in the form of one or more magnetically driven stirrers 452 with a stirrer driver 452 located external to the separation tank 380 supplying a rotating magnetic field to cause rotation of a magnetic stirrer bar or blade 456 immersed in the fluid with in separation tank 380. Use of magnetically driven stirrers 452 avoids the need for rotary seals that would be required if mechanically driven stirrers were used. However, mechanically driven stirrers can effectively be used in the inventive bulk separation process to introduce the desired turbulence within separation tank 380. Other implementations of fluid agitation system 450 may take the form of pneumatic "bubblers," fluid dynamic mixing, and ultrasonic or vibratory agitators.

As can be seen from the implementations illustrated in FIGS. 6, 7 and 8, bulk separation of single-walled tubular fullerenes based on chiral angle can be accomplished by displacement of the nanotube-bearing fluid relative to the separation plate, displacement of the separation plate relative to the nanotube-bearing fluid, or a combination thereof where both the separation plate and the nanotube-bearing fluid are supplied with relative motion. Further, by virtue of the channels 32 extending longitudinally across the crystalline substrate 30 at the energetically favored "locking angle" of the single walled tubular fullerenes to be separated based on a selected chirality, the relative motion between the nanotube-bearing fluid and the separating plate can be aligned or offset with respect to the orientation of the channels 32. In fact, the fluid flow can be offset with respect to the plane defined by the surface of the substrate, including being orthogonal with respect thereto. A still further advantage of the channeled substrate bulk separation method is the avoidance of any need to align the axes of the single walled tubular fullerenes in the direction of the flow of the nanotube-bearing fluid.

Although this invention has been described in conjunction with specific forms and embodiments thereof, it will be appreciated that various modifications other than those discussed above may be resorted to without departing from the spirit or scope of the invention. For example, equivalent method steps may be substituted for those specifically shown and described, different solvents, surfactants or means for orienting nanotubes in a flow can be used in place of those described herein, certain processes may be used independently of other processes, and in certain cases particular sequences of method steps may be reversed or interposed, all without departing from the spirit or scope of the invention as defined in the appended Claims.

What is being claimed is:

1. A system for bulk separation of single-walled tubular fullerenes based on chiral angle, comprising:
    a container assembly for holding and dispensing a fluid bearing single-walled tubular fullerenes of a multiplicity of different chiral angles;
    a separation plate defined by a crystalline substrate having a lattice structure being exposed within a plurality of longitudinally directed channels formed on a surface of said crystalline substrate, each of said channels being formed to have a width selected to limit an angular tolerance of single-walled tubular fullerenes to be not greater than six degrees, said longitudinal direction being selected to be at an energetically favored angular orientation of an axis of said lattice structure of said crystalline substrate with respect to an axis of a lattice structure for single-walled tubular fullerenes of one chiral angle to be adsorbed to said crystalline substrate;
    a transport assembly coupled in fluid communication with said container assembly and having at least one outlet for discharging said fluid bearing said single-walled tubular fullerenes to flow across said separation plate, wherein any of said single-walled tubular fullerenes of said one chiral angle passing into a respective one of said channels being preferentially adsorbed and thereby held to said exposed portions of said upper surface of said crystalline substrate therein; and
    a collection assembly disposed adjacent to and downstream of said separation plate for receiving said fluid and any of said single-walled tubular fullerenes not adsorbed on said crystalline substrate.

2. The system as recited in claim 1, wherein said crystalline substrate has a plurality of linearly directed barrier members extending thereacross and disposed in laterally spaced relationship on an upper surface of said crystalline substrate to respectively form said channels between adjacent pairs of said barrier members.

3. The system as recited in claim 1, wherein said container assembly includes a container having at least one displaceable wall for decreasing a volume of said container to establish said flow of said fluid bearing said single-walled tubular fullerenes.

4. The system as recited in claim 1, wherein said container assembly includes a container adapted to be pressurized to establish said flow of said fluid bearing said single-walled tubular fullerenes.

5. The system as recited in claim 1, wherein said at least one outlet discharges said fluid bearing said single-walled tubular fullerenes to flow in a direction corresponding to said longitudinal direction of said channels.

6. The system as recited in claim 1, wherein said at least one outlet discharges said fluid bearing said single-walled tubular fullerenes to flow in a direction angularly offset with respect to said longitudinal direction of said channels.

7. The system as recited in claim 1, wherein said at least one outlet discharges said fluid bearing said single-walled tubular fullerenes to flow in an angularly offset direction with respect to a plane defined by said surface of said crystalline substrate.

8. The system as recited in claim 1, wherein said separation plate is disposed on a support for rotative displacement together with said discharge of said fluid bearing said single-walled tubular fullerenes.

9. A system for bulk separation of single-walled tubular fullerenes based on chiral angle, comprising:
    a receptacle for holding a fluid bearing single-walled tubular fullerenes of a multiplicity of different chiral angles;
    a separation plate defined by a crystalline substrate having a lattice structure being exposed within a plurality of longitudinally directed channels formed thereon, each of said channels being formed to have a width selected to limit an angular tolerance of single-walled tubular fullerenes to be not greater than six degrees, said longitudinal direction being selected to be at an energetically favored angular orientation of an axis of said lattice structure of said crystalline substrate with respect to an axis of a lattice structure for single-walled tubular fullerenes of one chiral angle to be adsorbed to said crystalline substrate, said separation plate being insertable into said receptacle for immersion in said fluid; and
    a displacement assembly for displacing said separation plate relative to said fluid, wherein any of said single-walled tubular fullerenes of said one chiral angle entering into a respective one of said channels by said relative displacement being preferentially adsorbed and thereby held to said exposed portions of said upper surface of said crystalline substrate therein.

10. The system as recited in claim 9, wherein said displacement assembly includes an agitator coupled to said receptacle for agitating said fluid to impart a motion to said single-walled tubular fullerenes therein relative to said separation plate.

11. A system for bulk separation of single-walled tubular fullerenes based on chiral angle, comprising:
    a receptacle for holding a fluid bearing single-walled tubular fullerenes of a multiplicity of different chiral angles;
    a separation plate defined by a crystalline substrate having a lattice structure being exposed within a plurality of longitudinally directed channels formed thereon, said longitudinal direction being selected to be at an energetically favored angular orientation of an axis of said lattice structure of said crystalline substrate with respect to an axis of a lattice structure for single-walled tubular fullerenes of one chiral angle to be adsorbed to said crystalline substrate, said separation plate being insertable into said receptacle for immersion in said fluid; and
    a displacement assembly for displacing said separation plate relative to said fluid, wherein any of said single-walled tubular fullerenes of said one chiral angle entering into a respective one of said channels by said relative displacement being preferentially adsorbed and thereby held to said exposed portions of said upper surface of said crystalline substrate therein, said displacement assembly including a carrier for holding said separation plate and an immersion assembly coupled to said holder for immersing said separation plate in said fluid and moving said separation plate within said receptacle to thereby move said separation plate relative to said fluid.

12. The system as recited in claim 11, wherein said displacement assembly includes an agitator coupled to said receptacle for agitating said fluid to impart a motion to said single-walled tubular fullerenes therein relative to said separation plate.

\* \* \* \* \*